United States Patent Office 3,684,682
Patented Aug. 15, 1972

3,684,682
APPARATUS FOR ELECTROLYTICALLY ETCHING A WORKPIECE
Kazushige Koike, Kasugai-shi, Japan, assignor to Mitsubishi Electric Corporation, Tokyo, Japan
Filed June 8, 1970, Ser. No. 44,167
Claims priority, application Japan, June 24, 1969, 44/49,856
Int. Cl. B01k 3/00; B23p 1/04, 1/12
U.S. Cl. 204—224                    12 Claims

ABSTRACT OF THE DISCLOSURE

An apparatus for electrolytically etching a workpiece wherein controls are provided to selectively control the working feed so as to maintain the working current density at a predetermnied value in a working gap and at the same time to maintain the working current in the working gap at a predetermined value.

BACKGROUND OF THE INVENTION

Field of the invention

This invention relates to an apparatus for electrolytically etching a workpiece and more particularly to apparatus for controlling an electrolytic etching apparatus.

Description of prior art

Electrolytic etching apparatus are generally designed such that a working electrode is properly disposed to form a small working gap between the workpiece being etched and the juxtapositioned working electrode. An electrolyte is permitted to flow through the working gap at a high speed and a working electric current is passed through the working gap. The electrolyte is electrolyzed by the working current so that the workpiece is etched in a desired configuration by electrolytic action. A positive electrode dissolving action is provided to remove selective parts of the workpiece. If the workpiece and working electrode remain fixed, the working gap will increase. It is necessary, therefore, to provide a device to return the working gap to its original distance by causing the working electrode and the workpiece to constantly reapproach each other as the etching proceeds.

Two types of feed devices have been provided in electrolytic etching apparatus to accomplish this purpose. One typ is the so-called "constant current type," which acts to maintain the electrolytic current or working current flowing through the working gap at a predetermined value so that voltage changes across the working gap or working voltage can be detected and used to control the rate of feed of the working electrode or the workpiece so that the working voltage is constantly readjusted to a predetermined value. The other type is the "constant current density type," which acts to maintain the working voltage at a predetermined value so that the working electrode or workpiece is at a constant speed.

These types of feed systems will now be further illustrated by reference to FIG. 1. In this figure, there is provided a workpiece 10, a working electrode 12, and a working gap 14 therebetween. The working electrode 12 has a cylindrical working portion 16 which is characterized by a variable diameter which gradually diminishes as it approaches the top or end section adjacent to the working gap 14. In FIG. 1(a), etching occurs only at that portion of the electrode 12 designated by broken line A. In FIG. 1(b), etching occurs at that portion of the electrode 12 designated by broken line B. In FIG. 1(c), etching occurs at that portion of the electrode 12 designated by broken line C. The entire etching process proceeds as shown in FIGS. 1(a), 1(b), and 1(c) in order.

The relationship between the cross-sectional areas (S) at point A (Sa), B (Sb) and C (Sc) are adjusted so that $Sa < Sb < Sc$. The etch area is thereby increased as the etching proceeds.

If a constant current type feed is used, as the etched area is gradually increased, the working current density will decrease gradually and the speed of etching will be reduced as the current density is reduced. The operator then must manually adjust the apparatus to correct for the increase in the working current as the etched area increases, but this is often quite difficult. In the constant current density type feed system, the working speed is kept constant so that the current density is kept constant and a constant etching speed is obtained. If the working area is increased, however, as etching proceeds in order to hold the current density constant, the working current must be gradually increased with the danger that the quantity of current may exceed the maximum allowable current limit. For this reason, if the etched area is increased as the etching process proceeds, as shown in FIG. 1, the maximum etched area is determined by the maximum working area and maximum allowable current limit of the source of power. These factors, in turn, determine the proper speed. A shown in FIGS. 1(a) and 1(b), however, even if the etching area is small at the start of the process, a higher feed speed cannot be obtained so that this technique is not considered to be too efficient.

SUMMARY OF THE INVENTION

Accordingly, it is one object of this invention to eliminate the aforementioned disadvantages of the conventional device and to provide an improved apparatus for electrolytic etching of a workpiece so as to improve the working feed speed and etching efficiency.

Another object of this invention is to provide an improved apparatus for electrolytically etching which permits the maintenance of a constant working gap so that etching accuracy is controlled.

These and other objects have now herein been attained by providing an appaartus for electrolytically etching which in one aspect comprises a working electrode which is disposed in juxtaposition to a workpiece so as to provide a small working gap between the electrode and the workpiece. A source of power is provided for applying a working voltage to the working gap so as to pass a working current through an electrolyte which is permitted to flow through the working gap. A means is provided for causing the workpiece to approach the working electrode as the etching proceeds and in accordance to the control mode indicated by the control means. Control means are provided for imparting a first control mode to the feed means for maintaining the working current density at a predetermined value in the working gap and for imparting a second control mode for maintaining the working current in the working gap at a predetermined value.

BRIEF DESCRIPTION OF THE DRAWINGS

Other objects, features and advantages of the present invention will further become apparent from the following description taken in conjunction with the accompanying drawings, in which.

DETAILED DESCRIPTION OF PREFERRED EMBODIMENTS

Figure 2:
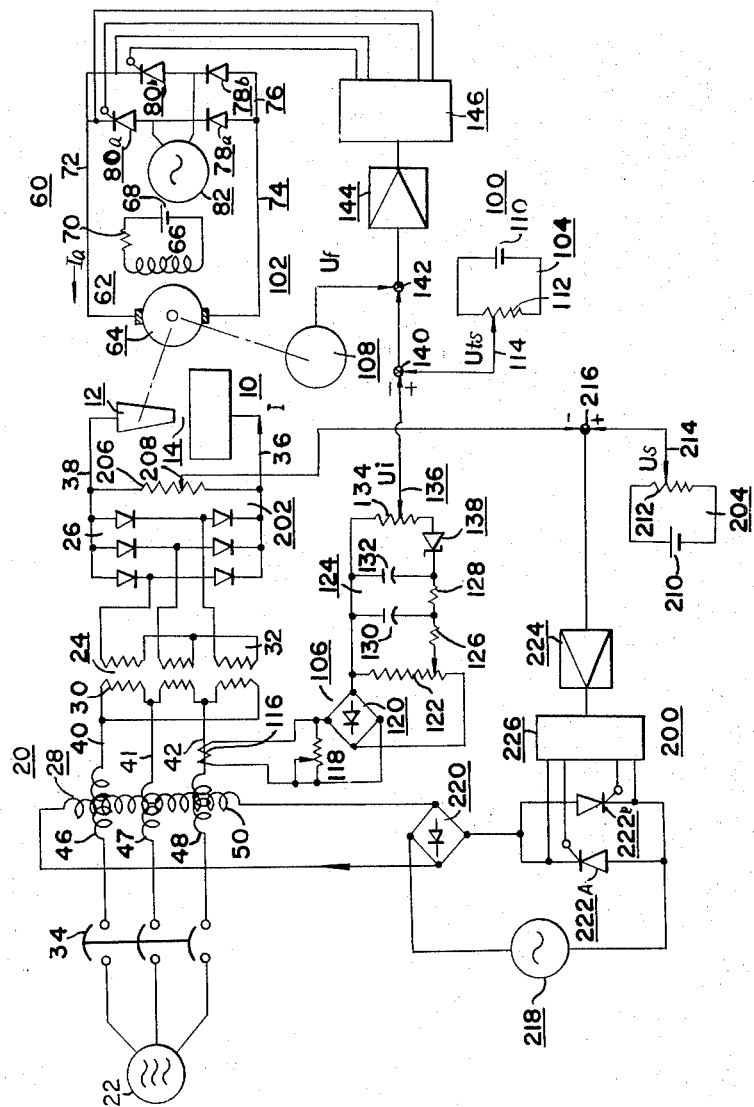
FIG. 2 is a schematic block diagram of one embodiment of the apparatus constructed in accordance with the present invention; and, FIG. 3 is a schematic block diagram of an other embodiment of this invention.

Reference is made to the drawings, and particularly to FIG. 2, which shows one embodiment constructed in accordance with the concepts of this invention. The arrangement illustrated comprises a workpiece 10, a working electrode 12, a working gap 14 therebetween having a space of between 0.1–0.5 mm. A source of power 20 is provided which includes a constant-voltage three-phase source of power 22, a three-phase transformer 24, a three-phase full-wave rectifier 26 and a saturable reactor 28. The three-phase transformer 24 includes a primary coil 30 connected in delta configuration and a secondary coil 32 connected in star configuration. The respective input terminals of the primary coil 30 are connected to the output terminal of the source 22 through a three-phase interlock switch 34. The alternating current input terminals of the three-phase full-wave rectifier 26 are connected to the respective output terminal of the secondary coils 32. The full-wave rectifier 26 provides the direct current output voltage at the conductive lines 36 and 38. The line 36 is connected to the positive side of the output terminal of the full-wave rectifier 26. The line 38 is connected to the negative output terminal. The line 36 is connected to the workpiece 10 and the line 38 is connected to the electrode 12 for etching. Lines 40, 41 and 42 are connected between the primary coil 30 of the transformer at the respective input terminals thereof and to the three-phase switch 34. The output coils 46, 47 and 48 of reactor 44 are inserted intermediate of the respective lines 40, 41 and 42 and the reactance thereof is controlled by the common control coil 50. The source 20 is provided for supplying the working voltage V between the lines 36 and 38. Good results are obtainable when $V = 5$ to $20$ volts.

An electrolyte supply device (not shown) is provided for supplying an electrolyte to the working gap 14. The electrolyte supply device include, for example, a pump for feeding the electrolyte from the tank to supply it through an opening formed in the working electrode 12 and into the working gap 14. The electrolyte is permitted to flow at a high speed through gap 14.

A working current I is impressed in the working gap 14 and depends upon the working voltage V. This working current I flows through the lines 36, 38, and the full-wave rectifier 26, and good results are obtainable when $$I = 1,000 - 5,000$$

amperes. The working current I electrolyzes the electrolyte so that it dissolves out from the positive potential workpiece 10 a part corresponding to the shape of the working electrode 12.

Saturable reactor 28 acts as an adjusting device for the working voltage V by adjusting the reactance of the output coils 46, 47, and 48 in response to the current Ic flowing through the control coil 50 which, in turn, adjusts the input voltage supplied to the three-phase transformer 24.

The arrangement also comprises a feeding device 60 which includes an electric motor 62 for moving the working electrode 12 either closer or away from workpiece 10. This motor 62 is constructed as a series shunt motor and includes a rotary armature 64 and field coil 66, a constant-voltage direct current source of power 68 connected through a variable resistor or potentiometer 70 to the field coil 66 for supplying an exciting power to the motor 62, lines 72 and 74 connected to the respective terminals of the armature 64, and a rectifier 76. The rectifier 76 consists of two diodes 78a and 78b, and two thyristors 80a and 80b, for rectifying the alternating current of the constant-voltage single-phase alternating current source of power 82. In the rectifier 76, the thyristor 80a and diode 78a are connected in series with each other, while the thyristor 80b and diode 78b are connected in series with each other. The input voltage from the source 82 is thereby applied to the respective terminals 72 and 74. The respective cathodes of the thyristors 80a and 80b are connected together to the conductive line 72 and the respective anodes of the diodes 78a and 78b are connected together to the line 74. The thyristors 80a and 80b act to provide a current Ia proportional to the phase for firing the same to the lines 72 and 74 and then to the armature 64. The phase for firing the thyristors 80a and 80b is adjusted to vary the current Ia to thereby adjust the rotating speed of the motor 82 or feeding speed of the working electrode 12.

The feeding device 60 is connected to the working electrode 12 from the motor 62 and thereby moves the working electrode 12. Alternatively, the workpiece 10 may be moved in a similar manner.

The control device will now be described. The control device is shown as including a feeding control system 100 for controlling the feeding device 60 and a working voltage control system 200 for controlling the working voltage V.

The feeding control system 100 will now be described. The system 100 includes three signal generating sources 102, 104 and 106. The signal generating source 102 generates a signal Uf proportional to the motor speed 62 or feeding speed and includes a generator 108 which is connected to the rotor 64 of the motor 62 so that the proper signal Uf is applied thereto. The signal generating source 104 mainly acts as a constant current density system and generates a constant reference signal Ufs. The signal generating source 104 includes a constant-voltage direct current source 110 and a potentiometer 112 connected thereacross. The signal Ufs is generated at the output terminal 114 of the potentiometer 112. The signal generating source 106 mainly acts as a constant-current system for generating a signal Ui proportional to the working current I. The signal generating source 106 includes a current transformer 116 which is inductively connected to the line 42. This transformer 116 does not directly provide the working current I, but since the amplitude of the alternating current flowing through the line 42 is proportional to the working current I, a voltage proportional to the working current I may be generated. A potentiometer 118 is provided between the output terminals of the current transformer 116. A single-phase full-wave rectifier 120 is provided for rectifying the alternating voltage across a potentiometer 122 which is connected between the direct current output terminals of the full-wave rectifier. A smoothing circuit 124 is provided for smoothing the output voltage of the potentiometer 122 and includes resistors 126, 128, and condensors 130 and 132. A potentiometer 134 is connected to the output terminal of the smoothing circuit 124 and includes an output terminal 136 for generating the signal Ui thereat.

The signal generating source 106 includes a switchable element 138 which serves to switch from the constant-current density system to the constant-current system. The switchable element 138 may be a Zener diode provided between the smoothing circuit 124 and the potentiometer 134. If the breakdown voltage of the Zener diode is expressed by Uz, then when the output voltage of the smoothing circuit 124 exceeds the voltage Uz, the signal Ui will be provided at the output terminal 136 of the potentiometer 134. If the output voltage of the smoothing circuit 124 is below the Zener voltage Uz, then the output signal Ui will be zero.

In the feeding control system 100, the signals Ufs and Ui are compared at the signal comparison circuit 140 and the difference between the signals $Ufs - Ui$ is then compared with the signal Uf at the signal comparison circuit 142. The arrangement also includes an amplifier 144 for amplifying the signal at the output of the comparison circuit 142, a firing device 146 for receiving the output of the amplifier, a circuit for providing a firing signal to the thyristors 80a and 80b and a circuit for adjusting the phase for firing the thyristors 80a and 80b by varying the phase of the firing signal.

When the signal Ui is zero, the signals Ufs and Uf will be compared at the signal comparison circuit 142 and the motor 62 will rotate at a constant speed corresponding to the signal U$fs$. If the signal U$f$ is larger than the signal U$fs$, the difference thereof will delay the output phase of the firing signal at the firing device 146 through the amplifier 144 and thereby act to increase the phase for firing the thyristors 80$a$ and 80$b$ so that the current I$a$ flowing through the armature 64 of the motor 62 is reduced and the motor speed thereby decreased with the result that the signal U$f$ becomes equivalent to the signal U$fs$. On the other hand, when the signal U$f$ is smaller than the signal U$fs$, the output of the difference at the comparison circuit 142 will serve to advance the phase of the firing signal at the firing device 146 through the amplifier 144 so that the phase for firing the thyristors 80$a$ and 80$b$ is lessened and the current I$a$ flowing through the armature 64 of the motor 62 is increased. The result is that the motor speed will now be increased so that the signal U$f$ becomes equivalent to the signal U$fs$ and the motor speed becomes constant so that a constant feeding speed may be obtained.

If the signal U$i$ is present, the signal U$fs-Ui$ will be smaller than the signal U$f$ alone and the motor speed will thereby becomes slower and serve to decrease the feeding speed. This decrease of the feeding speed will cause the working gap 14 to increase and the electric equivalent resistance of the working gap 14 to increase such that the working current I is also reduced. Thus, if the signal U$i$ is present, it will have the effect of decreasing the working current I and thereby prevent the same from exceeding a predetermined value.

The working voltage control system 200 to control the working voltage V will now be described. This control system 200 comprises two signal generating sources 202 and 204. The signal generating source 202 includes a potentiometer 206 connected between the lines 36 and 38 and provides at the output terminal 208 thereof a signal U proportional to the working voltage V.

A signal generating source 204 generates a constant reference signal U$s$ and includes a constant-voltage direct current source 210 and a potentiometer 212 connected thereacross. A signal U$s$ is generated at the output terminal 214 of the potentiometer 212. The signals U and U$s$ are compared at a comparison circuit 216 which generates a signal equal to the difference $U-Us$. The arrangement also includes a constant-voltage single-phase alternating current source 218 of power of a commercial frequency and a single-phase full-wave rectifier 220 for receiving alternating current from the alternating current source. The output terminal of the rectifier 220 is connected to the control coil 50 of the saturable reactor of the source 20 for imparting the current I$c$ to the control coil 50. Thyristors 222A and 222B are provided in parallel with each other and placed in opposite directions between the input terminals of the full-wave rectifier 220 and the source 218. The thyristors 222A and 222B adjust the current I$c$ in response to the phase for firing the same and thereby serve to adjust the voltage of the saturable reactor 28. An amplifier 224 amplifies the signal $U-Us$ received from the signal comparison circuit 216, and a firing device 226 receives the output of the amplifier. The firing device 226 includes a circuit for providing firing signals to the thyristors 222A and 222B and for adjusting the phase for firing the thyristors 222A and 222B.

The control system 200 will adjust the working voltage V to a predetermined value. If the signal U is larger than the signal U$s$, the output of the amplifier 224 will delay the firing phase at the firing device 226 so that the phase angle for firing the thyristors 222A and 222B is enlarged and thereby serves to decrease the output voltage of the full-wave rectifier 220. The current I flowing through the control coil 50 of the saturable reactor will, in turn, be reduced, while the reactance of the output coils 46, 47 and 48 will be increased and serve to decrease the working voltage V until the signal U becomes equivalent to the signal U$s$. If the signal U is smaller than the signal U$s$, the same will be controlled to increase the working voltage V until the signal U becomes equivalent to the signal U$s$. The working voltage V is thereby adjusted to a predetermined value corresponding to the reference signal U$s$. The adjusting action of the working voltage V will always be provided at the feeding control system 100 whether or not the signal U$i$ is present.

In the embodiment shown in FIG. 2, it should be understood that the working current I is never increased over the desired predetermined value and as such the etching rate may be advantageously controlled. If the working current I reaches the predetermined value the signal U$i$ will be presented and assure that the working current I is not further increased. When the signal U$i$ is presented, the working current I is limited to the maximum allowable current value of the source 22, and this is properly set to the desired predetermined value by adjusting the potentiometers 118 and 122 at the signal generating source 106.

It should be understood that the breakdown value of the Zener diode 138 may be varied by using a different Zener voltage U$z$.

Figure 1:
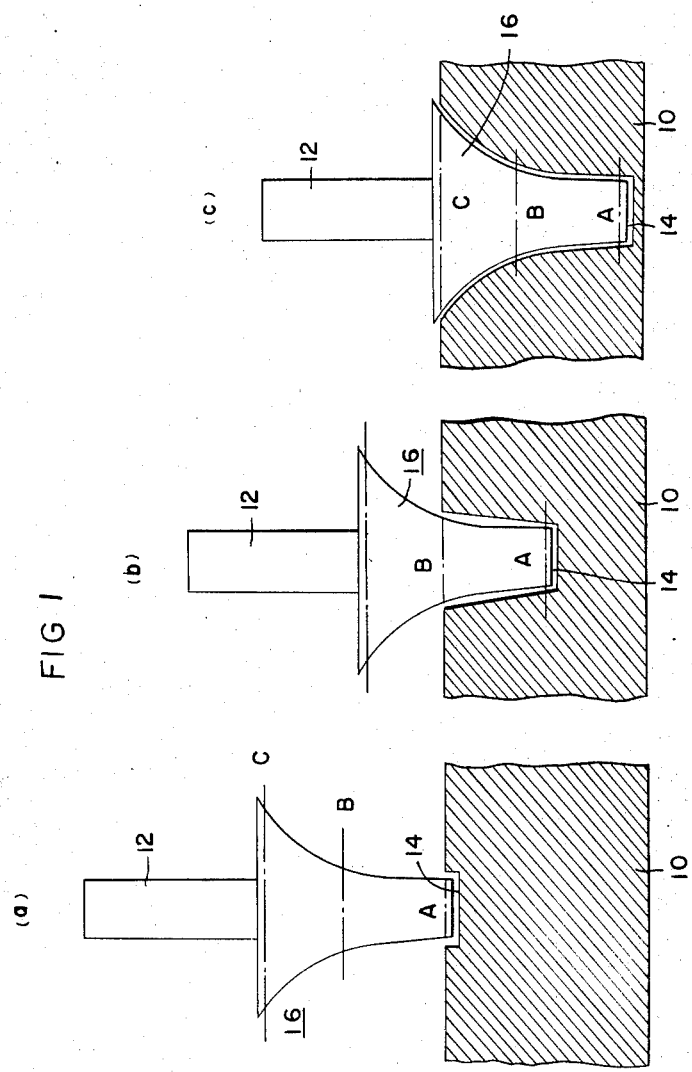
FIGS. 1(a), (b) and (c) are sectional views of an electrode and a workpiece treated in an electrolytic etching process.

If the working current I is not increased over the predetermined value, then the signal U$i$ is not needed; that is, under such conditions, the signal U$fs$ of the signal generating source will impart the desired constant feeding. If the working feed speed is fast enough, the etching may be done efficiently at a larger current density. In this case, it is not necessary to reduce the working feed rate in response to the maximum etching area. For example, in the embodiment shown in FIG. 1, it may be possible to set a high working feed rate so that the working current I will reach the maximum allowable current of the source 22. The etching efficiency may thus be improved.

Though the above embodiment includes a Zener diode as the direct switchable element with respect to the signal generating source 106 it should be understood that the invention is not so limited and that the same effect may be provided by a device which detects a signal proportional to the working current I in such a manner to provide that whenever the working current I approaches the desired predetermined value, this device will become operable for opening or closing and thereby allow generation of the signal U$i$ at the output of the signal generating source 106 so that the same can be applied to the signal comparison circuit 140.

Figure 3:
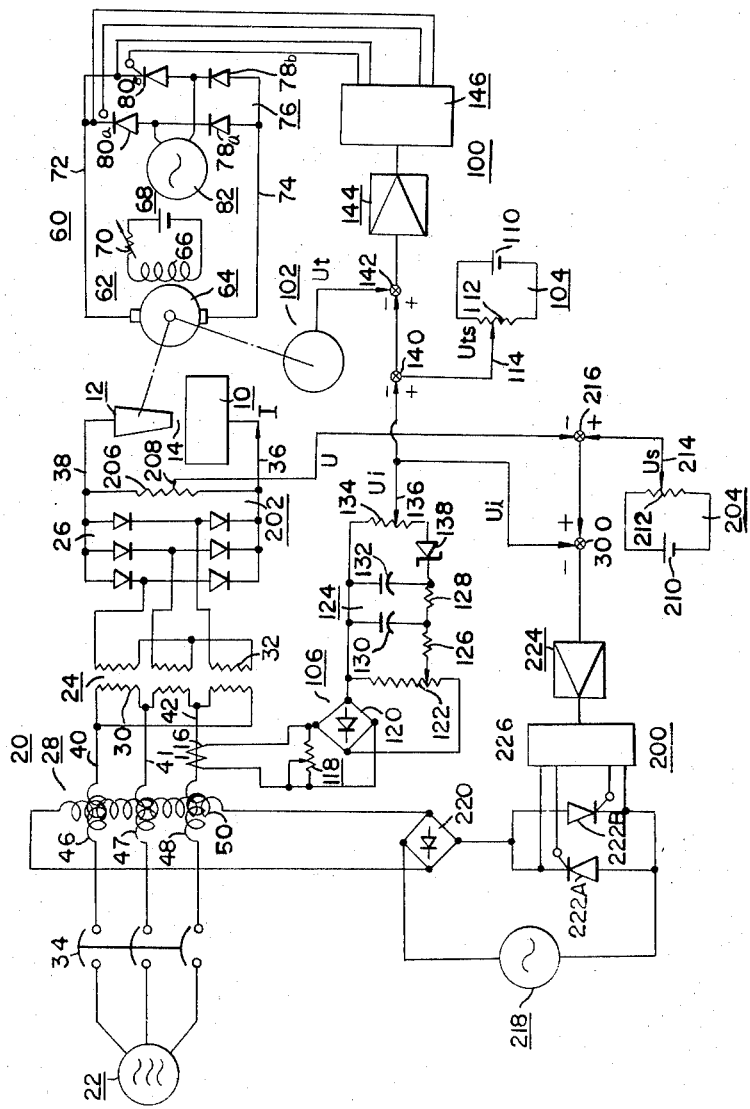

In FIG. 3, an alternative and further improved embodiment is shown.

First, it should be noted that the distance $g$ of the working gap 14 or the size between the workpiece 10 and working electrode 12 in relative direction may be obtained by the following formula:

$$g = V/\rho J$$

where $\rho$ expresses the specific resistance of the electrolyte supplied to the working gap 14,
J is the working current density in the working gap 14, and
V is working voltage.

The distance $g$ of the working gap should preferably be maintained as constant as possible so as to improve the working accuracy. In the embodiment shown in FIG. 2, if the signal U$i$ is not presented, and a constant working feed is imparted, the current density J will be constant and from the equation if the specific resistance $\rho$ and working voltage V are constant, then the size $g$ of the working gap will be constant. However, if the signal U$i$ is present, then the working current will be adjusted to a predetermined value. If, however, the etching area is increased, the current density J will thereby be decreased so that even if the specific resistance $\rho$ and working voltage V are constant, the distance $g$ of the working gap will be increased.

The embodiment shown in FIG. 3 will provide control for the working voltage V so as to compensate for changes in the current density. In FIG. 3, the signal comparison circuit 300 will receive the signal $Us-U$ from the signal comparison circuit 216 at the output of the working voltage control system 200 and will generate the signal $(Us-U)-Ui$ upon receipt of the siganl $Ui$. This signal is then supplied to the amplifier 224.

In the embodiment shown in FIG. 3, if the signal $Ui$ is present, the working voltage V will be decreased in the same maner as the signal U is made larger than the signal $Us$, so that the working current density J will be kept constant. If a constant feed is used, the signal $Ui$ will not be generated. However, if the working current I is so restricted that a decrease in the current density will occur, then the signal $Ui$ will be generated. Thus, since the signal $Ui$ is inversely proportional to the current density, it may accordingly be used to restrict the variation of the working gap in size.

It should be understood from the foregoing description that according to the teachings of the present invention, the working speed and working efficiency may be improved.

It should also be understood that if the apparatus of the present invention is so constructed to provide a signal to restrict the working current when the same reaches a predetermined value, the variations in the working voltage may also be restricted and as such serve to improve the etching accuracy.

Obviously, many modifications and variations of the present invention are possible in light of the above teachings. It is to be understood, therefore, that within the scope of the appended claims, the invention may be practiced otherwise than as specifically described.

What is claimed and desired to be secured by Letters Patent is:

1. An apparatus for electrolytic etching a workpiece comprising:
   (a) a working electrode adapted to be positioned opposite to a workpiece and having a small working gap therebetween,
   (b) a source of power for applying a working voltage to said working gap to cause a working current to flow through an electrolyte when within the working gap,
   (c) means for feeding either said workpiece or said working electrode towards each other, and
   (d) control means for selectively applying a first control mode for controlling said feeding means for maintaining the working current density at a predetermined value within said working gap and a second control mode for controlling said feeding means for maintaining the working current within said working gap at a predetermined value.

2. An apparatus as claimed in claim 1, further comprising means for controlling said working voltage to maintain the same at a predetermined value.

3. An apparatus as claimed in claim 1, wherein said control means includes a switchable element for switching the control mode so that said first control mode is used to increase the working current to a predetermined value, whereupon said second control mode switched to automatically.

4. An apparatus as claimed in claim 1, further comprising a voltage control means for controlling said working voltage to compensate for changes in the working gap due to changes in the working current density when said second control mode is used to vary the working current density.

5. An apparatus as claimed in claim 1, wherein said control means includes:
   (a) a first signal source for generating a first signal proportional to the feeding speed,
   (b) a second signal source for generating a second signal as a standard, and
   (c) a third signal source for generating a third signal proportional to said working current, wherein said first control mode is used for making said first signal equal to said second signal, and wherein said control mode is used for making said first signal equal to the difference of the second and third signals.

6. An apparatus as claimed in claim 5, further comprising voltage control means for maintaining said working voltage at a predetermined voltage.

7. An apparatus as claimed in claim 6, wherein said voltage control means comprises
   (a) a fourth signal source for generating a fourth signal proportional to said working voltage,
   (b) a fifth signal source for generating a fifth signal as a standard, and wherein said fourth signal is made equal to the fifth signal.

8. An apparatus as claimed in claim 5, wherein said control means includes a switchable element for switching the control mode so that said first control mode is used to increase the working current until a predetermined value is reached whereupon said second control mode is switched to automatically.

9. An apparatus as claimed in claim 8, wherein said switchable element is a Zener diode disposed to receive said third signal so that when said working current reaches a predetermined value a breakdown will occur and substantially reduce said second signal to the value of said third signal.

10. An apparatus as claimed in claim 5, further comprising voltage control means for controlling said working voltage to compensate for changes in the working gap due to variation of the working current density when said second control mode is used to vary the working current density.

11. An apparatus as claimed in claim 10, wherein said control means further comprises a switchable element for automatically switching to said second control mode when said first control mode which is used to increase the working current reaches a predetermined value.

12. An apparatus as claimed in claim 11, wherein said voltage control means comprises a fourth signal source for generating a fourth signal proportional to said working voltage, and a fifth signal source for generating a fifth signal as a standard, and wherein said switchable element is a Zener diode disposed so as to receive said third signal so that when a breakdown occurs when said working current reaches a predetermined value said third signal will substantially reduce the value of said fifth signal and said second signal, and said fourth signal will become equal to said fifth signal.

References Cited

UNITED STATES PATENTS

| 3,536,881 | 10/1970 | Inoue | 204—143 M XR |
| 3,453,192 | 7/1969 | Wilkinson | 204—228 XR |

FOREIGN PATENTS

| 12,327 | 7/1966 | Japan | 204—143 M |
| 12,326 | 7/1966 | Japan | 204—143 M |
| 20,205 | 11/1966 | Japan | 204—143 M |

JOHN H. MACK, Primary Examiner

D. R. VALENTINE, Assistant examiner

U.S. Cl. X.R.

204—225, 228